United States Patent [19]
Takahashi et al.

[11] Patent Number: 5,995,387
[45] Date of Patent: Nov. 30, 1999

[54] SWITCHING POWER-SUPPLY UNIT

[75] Inventors: Seiichi Takahashi, Sagamihara; Yasuo Ohashi, Tokyo-to, both of Japan

[73] Assignee: Murata Manufacturing Co., Ltd., Japan

[21] Appl. No.: 09/085,615

[22] Filed: May 27, 1998

[30] Foreign Application Priority Data

Jun. 2, 1997 [JP] Japan .................................. 9-143779
Mar. 20, 1998 [JP] Japan ................................. 10-072260

[51] Int. Cl.$^6$ ................................................ H02M 3/335
[52] U.S. Cl. ............................................................ 363/21
[58] Field of Search .............................. 363/16, 20, 21, 363/95, 97, 131

[56] References Cited

U.S. PATENT DOCUMENTS

| | | | |
|---|---|---|---|
| 5,107,411 | 4/1992 | Misdom | 363/20 |
| 5,608,613 | 3/1997 | Jansen | 363/21 |
| 5,673,184 | 9/1997 | Rilly et al. | 363/21 |
| 5,757,628 | 5/1998 | Kamata | 363/21 |

*Primary Examiner*—Matthew Nguyen
*Attorney, Agent, or Firm*—Ostrolenk, Faber, Gerb & Soffen, LLP

[57] ABSTRACT

In a switching power-supply unit in which a series circuit comprising a primary winding of a switching transformer and a switching device is provided across the terminals of an input power supply, a noise-eliminating bypass capacitor is connected across the ends of the series circuit. The bypass capacitor forms a short circuit path for high frequency noise having a frequency higher than the switching frequency of the switching device, thereby reducing high-frequency radiant noise.

17 Claims, 6 Drawing Sheets

SWITCHING POWER-SUPPLY UNIT

BACKGROUND OF THE INVENTION

1. Field of the Invention

The present invention relates to a switching power-supply unit in which radiant noises from high frequency waves are reduced.

2. Description of the Related Art

A conventional forward switching power-supply unit will be described with reference to FIG. 5. 1 denotes an input power supply in which, for example, a rectifying circuit for rectifying a commercial power-supply voltage has a large capacitance capacitor, such as electrolytic capacitors, connected in parallel. The terminals of the input power supply 1 are connected in series to an input circuit comprising a primary winding 2a for a switching transformer 2, a switching device such as a field effect transistor (hereinafter referred to as an "FET") 3, and a resistor R1 comprising a current-detecting circuit 4. The input-power supply circuit 1 and an interconnection pattern for connecting them form a current-loop circuit a in which a current having a switching frequency flows, as indicated by a broken line, are disposed on a mounting circuit base.

Figure 6:
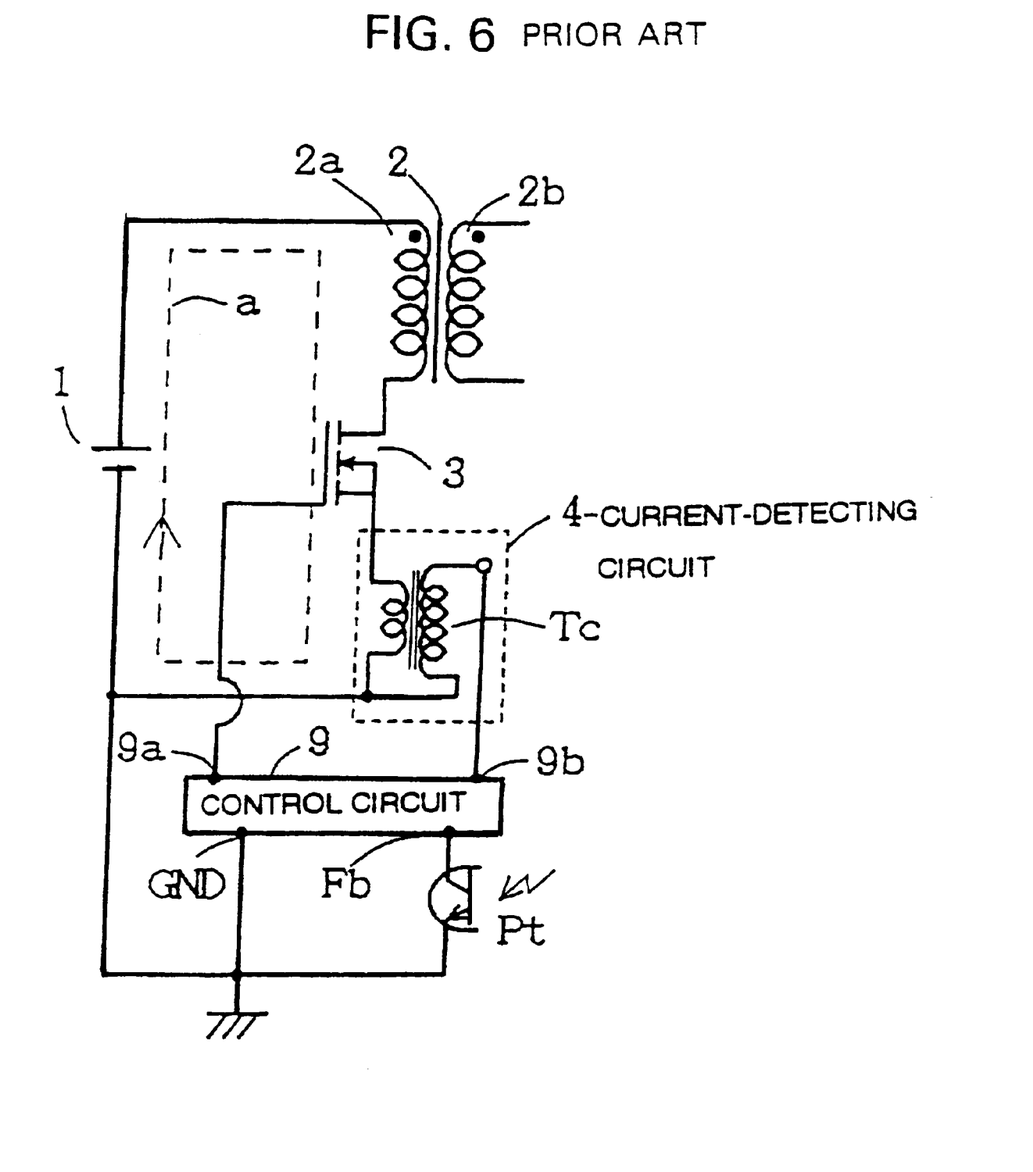
FIG. 6 is a partial circuit diagram showing another current-detecting circuit in a conventional switching power-supply unit.

The current-detecting circuit 4 may contain, instead of the resistor R1, a current transformer Tc shown in FIG. 6. FIG. 6 shows part of the switching power-supply unit.

A secondary winding 2b for the switching transformer 2 is connected to a rectifying and smoothing circuit 5. The rectifying and smoothing circuit 5 comprises a rectifying circuit and a smoothing circuit. The rectifying circuit comprises a rectifying diode D1 and a commutating diode D2. The anodes of the rectifying diode D1 and the commutating diode D2 are connected together. The anode of the rectifying diode D1 is connected to the start of the secondary winding 2b, and the anode of the commutating diode D2 is connected to the end of the secondary winding 2b.

The smoothing circuit comprises a choke input inductor L1 and a capacitor C1. One electrode of the inductor L1 is connected to the cathodes of the rectifying diode D1 and the commutating diode D2. The output of the rectifying and smoothing circuit 5 is supplied to a load 7 via the output terminals 6a and 6b of the switching power-supply unit.

An error-detecting circuit 8 is connected across the output terminals 6a and 6b. The error-detecting circuit 8 contains a parallel circuit of a series circuit comprising a photodiode Pd and a shunt regulator Sr, and a series circuit comprising voltage dividing resistors R2 and R3. The reference terminal of the shunt regulator Sr is connected to the point at which the voltage resistors R2 and R3 are connected.

The collector of a phototransistor Pt which is photocoupled to the photodiode Pd is connected to the feedback terminal Fb of a control circuit 9, and the emitter is connected to ground.

The output terminal 9a of the control circuit 9 is connected to the gate of the FET 3, and the current-detecting terminal 9b is connected to the source of the FET 3. The control circuit 9 includes a pulse width modulation (PWM) circuit or pulse frequency modulation (PFM) circuit, and provides for the switching of the FET 3 with a driving signal having a pulse width or pulse-repetition frequency changed in accordance with an error signal fed back from the error-detecting circuit 8. The control circuit 9 includes a breaking circuit for switching off the FET 3.

Next, the operation of the switching power-supply unit shown in FIG. 5 will be described.

Figure 7A:
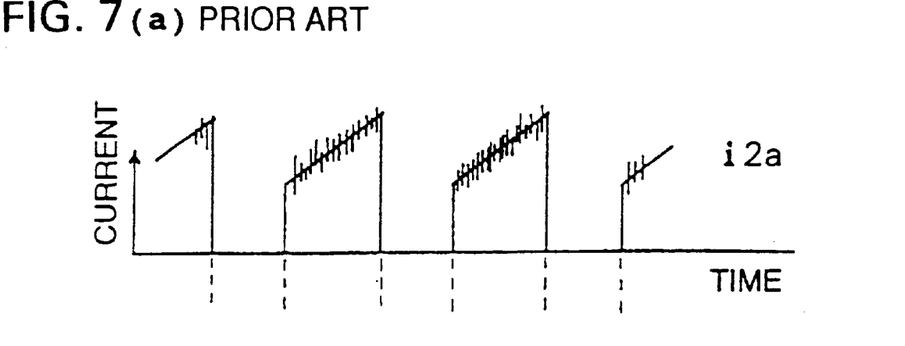
FIG. 7(a) to 7(c) are charts showing the cases that high-frequency noise current is superimposed on a trapezoid pulse current flowing in a primary winding and a secondary winding in a conventional switching power-supply unit.
Figure 7B:
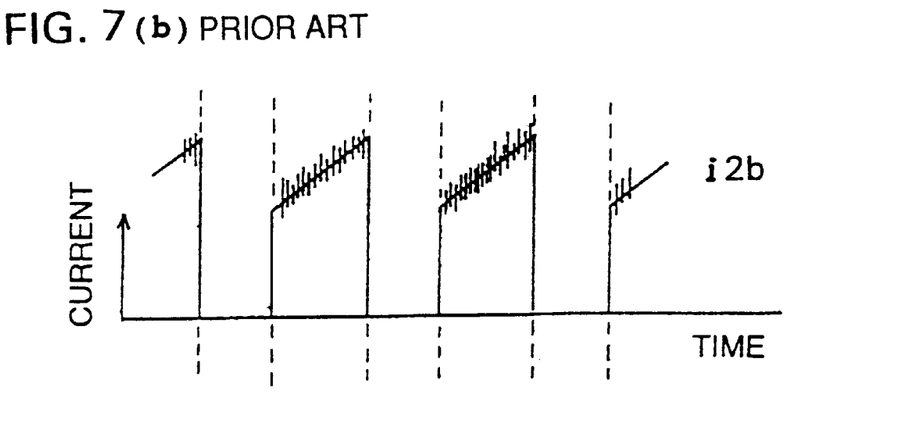
Figure 7C:
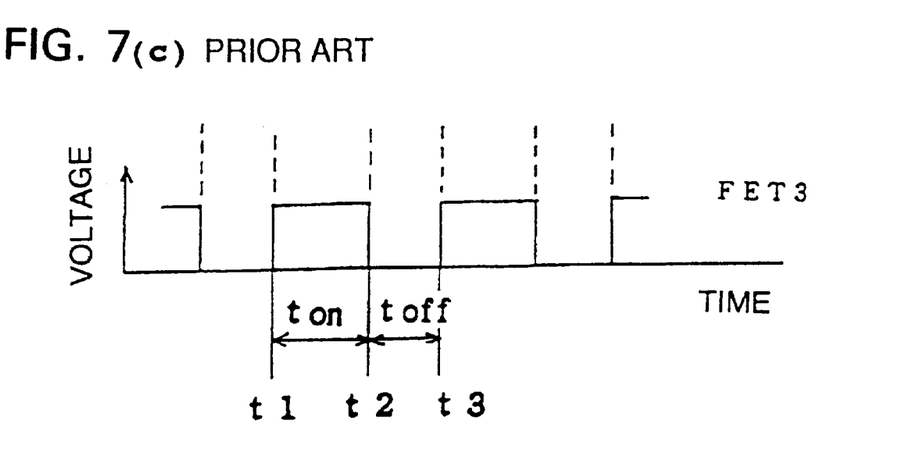

While the switching power-supply unit is stable, the FET 3 is switched on and off by driving signal pulses as shown in FIG. 7(c). Accordingly, in the primary winding 2a of the transformer 2, a trapezoid-pulse current $i_{2a}$ as shown in FIG. 7(a) flows, and in the secondary winding 2b, a trapezoid-pulse current $i_{2b}$ as shown in FIG. 7(b) flows.

In other words, switching on the FET 3 at time t1 applies a voltage $V_{in}$ from the input power supply 1 across the ends of the primary winding 2a. Accordingly, the current starts to flow rapidly in the primary winding 2a, and a voltage $V_{2b}$ is induced across the ends of the secondary winding 2b, which is electromagnetically coupled to the primary winding 2a. The induced voltage $V_{2b}$ is proportional to the turns ratio (N2b/N2a) of the number of turns N2b of the secondary winding and the number of turns N2a of the primary winding 2a.

In the forward switching power-supply unit, the induced voltage $V_{2b}$ forward biases the rectifying diode D1. This allows a current to flow in the loop of the secondary winding 2b, the rectifying diode D1, the inductor L1 and the capacitor C1, which charges the capacitor C1. The voltage $V_{C1}$ across the electrodes of the capacitor C1 is supplied to the load 7. The voltage VL1 across the electrodes of the inductor L1 is $(V_{2b}-V_{C1})$. Accordingly, when the inductance of the inductor L1 is L, and the conductive period of the FET 3 is $t_{on}$(t1–t2), the current $i_{2b}$ flowing in the secondary winding 2b can be given by the following expression:

$$d(i_{2b})=\{(V_{2b}-V_{C1})/L\}\cdot dt$$

where $0\leq t\leq t_{on}$. During the conductive period $t_{on}$, the current $i_{b2}$ gradually increases over time.

Switching off the FET 3 at time t2 rapidly increases the current $i_{2a}$ flowing in the primary 2a. Accordingly, the transmission of power from the primary winding 2a to the secondary winding 2b is lost, so that both currents $i_{2a}$ and $i_{2b}$ cannot flow in a non-conductive period $t_{off}$ (t2–t3) during which the FET 3 is switched off. During the non-conductive period $t_{off}$, reverse electromotive force is generated in the inductor L1. As a result, the current flows in the loop of the inductor L1, the capacitor C1 and the commutating diode D2, and the capacitor C1 discharges.

As a result, during the conductive period $t_{on}$ of the FET 3, the trapezoid-pulse currents $i_{2a}$ and $i_{2b}$ flow in the primary winding 2a and the secondary winding 2b.

Next, the case where the voltages of the output terminals 6a and 6b change will be described.

If it is assumed that the input power supply 1 or the load 7 causes the voltage of the output terminal 6a to increase, the voltage of the connection point of the voltage dividing resistors R2 and R3 also increases, and the reference voltage of the shunt regulator Sr also increases, which reduces the internal resistance between the anode and the cathode and which increases the current flowing in the photodiode Pd. This current increase reduces the internal resistance between the collector and emitter of the phototransistor Pt and the potential of the feedback terminal Fb of the control circuit 9.

Accordingly, the control circuit 9 controls the FET 3 by reducing the conductive period percentage or frequency of a control signal. This reduces the power transmitted from the primary winding 2a to the secondary winding 2b, which reduces the output voltage of the rectifying and smoothing circuit 5, namely, the output voltage across the output terminals 6a and 6b, so that the original working condition is restored.

In addition, when the voltage of the output terminal 6a decreases, the error-detecting circuit 8, the control circuit 9 and the current-detecting circuit 4 operate in reverse with respect to the above-described case, and the voltage across the output terminals 6a and 6b increases to restore the original working condition.

When an abnormal condition occurs, such as the short-circuiting of the load 7, in order to prevent damage due to an excess current in the FET 3, the current-detecting circuit 4 detects the current flowing in the FET 3 (via the voltage across the ends of resistor R1 or a voltage induced in the secondary winding of current transformer Tc shown in FIG. 6).

The detected voltage is used such that it is compared with a reference voltage in the control circuit 9, and when it exceeds the reference voltage, the FET 3 is switched off.

Recently, there has been employed a current mode control has been used in which the signal detected by the current-detecting circuit 4 is actively used as a control signal for the FET 3 because the current flowing in the FET 3 is proportional to the voltage of the input power supply 1.

According to conventional switching power-supply units, in general, the FET 3 is switched on and off at a frequency of 100 to 500 kHz. While the FET 3 is in the conductive condition $t_{on}$, a rapidly rising and dropping trapezoid-pulse current flows in the current-loop circuit a, indicated by a broken line in both FIG. 5 and FIG. 6, in which a current having a switching frequency flows. A voltage having a frequency higher than the switching period is generated, caused by a leakage inductance from the primary winding 2a of the transformer 2 and the parasitic capacitances of the terminals of the switching device 3, and further by the parasitic capacitance and parasitic inductance of the circuit interconnections. A noise current having a high frequency not less than several MHz is superimposed on the trapezoid pulse currents $i_{2a}$ and $i_{2b}$ flowing in the primary winding 2a and the secondary winding 2b, as shown in FIGS. 7(a) and 7(b).

Figure 2:
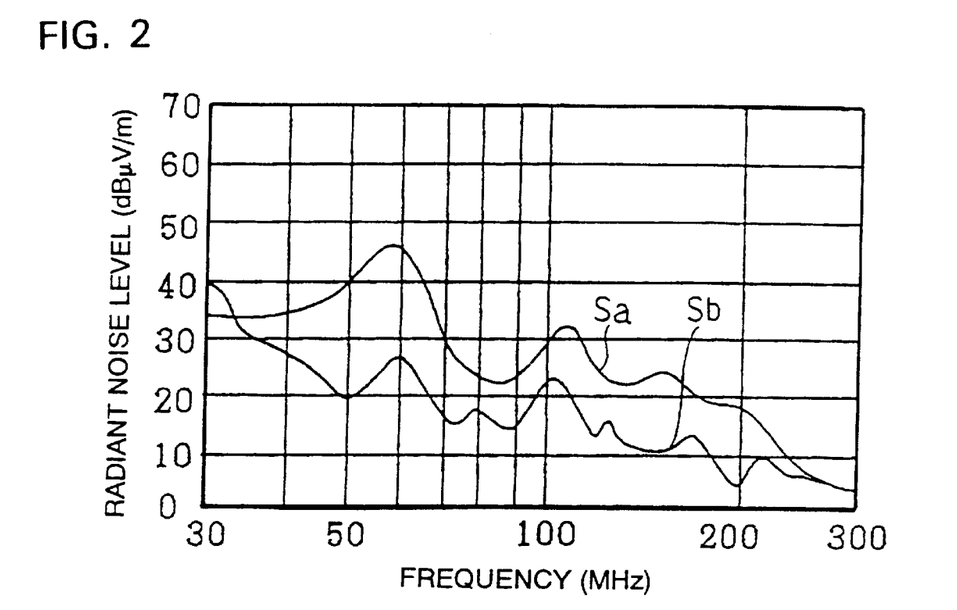
FIG. 2 is a characteristic chart formed by superimposing the envelopes of line spectra radiated from the switching power-supply unit shown in FIG. 1 and a conventional switching power-supply unit shown in FIG. 5.

When the trapezoid pulse current $i_{2a}$ on which the high frequency noise current is superimposed flows in the current-loop circuit a, radiant noise, such as line spectrum envelope Sa, is generated in a high frequency band, as shown in FIG. 2. The radiant noise tends to increase in proportion to the area of the current-loop circuit a on the mounting circuit base. This is because the circuit interconnection in which the switching frequency current having a high frequency lengthens as the area of the current-loop circuit a enlarges and the current-loop circuit a lengthens.

Accordingly, reducing the radiant noise requires an extreme reduction of the area of the current-loop circuit a on the mounting circuit base. Therefore, it is required to reduce the sizes of circuit components included in the current-loop circuit a and areas on which the components are mounted. Concerning the components included in the current-loop circuit a, the size reduction of the switching transformer 2 and the size reduction of the FET 3 are in progress by making the switching current have a high frequency and employing finer device processing, respectively.

Conversely, when the current-detecting circuit 4 is formed using the resistor R1, the size of the resistor R1 is determined by the loss, which makes it difficult to reduce its size. In addition, as shown in FIG. 6, when the current-detecting circuit 4 is formed using the current transformer Tc, the number of turns of its secondary winding cannot be reduced so as to prevent the saturation of the current transformer Tc, which also makes it difficult to reduce its size. As described, among the circuit components included in the current-loop circuit a, size reduction of the current-detecting circuit 4 is difficult, which limits the reduction of the current-loop circuit a.

SUMMARY OF THE INVENTION

Accordingly, an object of the present invention is to provide a switching power-supply unit in which radiant noise from a high frequency is reduced, by providing a path for a high-frequency noise current in part of the switching device-included current-loop circuit a in which switching frequency current having a high frequency flows.

The present invention has the following construction in order to solve the foregoing problems. According to a first aspect of the invention, there is provided a switching power-supply unit comprising a transformer having a primary winding and a secondary winding, a switching device for periodically interrupting a current flowing in the primary winding of the transformer, and an output circuit for using a voltage induced in the secondary winding of the transformer, in which the primary winding of the transformer and the switching device are connected in series to each other, and the ends of the series circuit are connected to a capacitive impedance circuit comprising a short circuit path for a frequency higher than the switching frequency of the switching device.

According to this arrangement, in the series circuit of the transformer primary winding and the switching device, a switching current having a switching frequency flows in accordance with the switching of the switching device. In addition, in the series circuit, a high-frequency noise current having a frequency higher than the switching frequency flows due to leakage inductance from the transformer and the parasitic capacitance of the switching device, and further due to the parasitic inductance and parasitic capacitance of the circuit interconnections.

The capacitive impedance circuit functions as a sufficiently low impedance for a high-frequency noise current which generates a high frequency in the case of a current having a switching cycle by the switching device. Accordingly, the high-frequency noise current, which flows in the series circuit of the primary winding and the switching device, can be short-circuited. The capacitive impedance circuit functions as a sufficiently high impedance for a switching current having a switching cycle. Accordingly, the switching current, which flows in the series circuit, cannot short-circuit. Therefore, the current path in which the high-frequency noise current flows shortens, which reduces high-frequency radiant noise radiated from the switching power-supply unit to ambient space.

The capacitive impedance circuit preferably comprises a short circuit path for the high-frequency noise current, such as a single function capacitor like a ceramic capacitor, or a capacitive circuit containing a capacitor. In addition, for example, a capacitive device like a variable capacitance diode may be used as the capacitive impedance circuit. In this case, after the switching power-supply unit is assembled, it is possible to perform adjustment to a capacitive impedance for providing a short circuit path for a high-frequency noise current having a frequency at which high-frequency radiant noise is largest.

According to a second aspect of the invention, there is provided a switching power-supply unit having a series circuit comprising a primary winding of a switching transformer and a switching device, connected to one terminal of an input power supply, a current-detecting circuit for detecting at least a change in a current flowing in the switching device, the current-detecting circuit connected across the series circuit and another terminal of the input power supply, an output circuit for rectifying and smoothing a voltage generated in a secondary winding of the switching transformer, and further comprising a capacitive impedance device for bypassing a current having a frequency higher than the switching frequency of the switching device connected in parallel to the series circuit.

According to this arrangement, in the series circuit of the switching-transformer primary winding and the switching device, and the current-detecting circuit, a switching current having a switching cycle flows in accordance with the switching of the switching device, and a high-frequency noise current having a frequency higher than the switching frequency flows due to leakage inductance from the switching transformer and the parasitic capacitance of the switching device, and further due to the parasitic inductance and parasitic capacitance of the circuit interconnections.

The capacitive impedance circuit functions as a sufficiently low impedance for a high-frequency noise current which generates a high frequency in the case of a current having a switching cycle by the switching device. Thus, it is a short-circuit for the high-frequency noise current, which flows in the series circuit comprising the primary winding and the switching device. However, since the capacitive impedance circuit functions as a sufficiently high impedance for the switching current, it is not a short-circuit. Accordingly, in the current-detecting circuit, the switching current flows but the high-frequency noise current flowing in the series circuit does not flow. Therefore, the current path in which the high-frequency noise current flows shortens, which reduces high-frequency radiant noise radiated from the switching power-supply unit to ambient space.

The capacitive impedance device is a device having the function of bypassing the high-frequency noise current, and for example, a capacitor on the market may be used.

According to a third aspect of the invention, there is provided a switching power-supply unit having an input circuit, comprising a primary winding for a switching transformer, a switching device and a current-detecting circuit, connected across the terminals of an input power supply, a rectifying and smoothing circuit connected to a secondary winding of the switching transformer, and a control circuit for using the current-detecting circuit to detect a change in a current flowing in the input circuit and to detect a change in the output of the rectifying and smoothing circuit so that the switching device is controlled, in which a noise-eliminating bypass capacitor is connected across the ends of a series circuit comprising the primary winding of the switching transformer and the switching device.

According to this arrangement, the control circuit performs a PWM (pulse width modulation) control or PFM (pulse frequency modulation) control of the switching device in accordance with an output change, and thereby stabilizes the output. In this case, the switching device is supplied with a driving signal for switching on and off the switching device at a predetermined conduction ratio. Thus, in accordance with the switching of the switching device, a current flows in the switching transformer primary winding and the current-detecting circuit. Simultaneously, a high-frequency current having a frequency higher than the switching frequency, namely, noise current, is generated due to leakage inductance from the switching transformer and the parasitic capacitance of the switching device, and further due to the parasitic inductance and parasitic capacitance of the circuit interconnections.

The bypass capacitor functions as a sufficiently low impedance for a high-frequency noise current which generates a high frequency in response to a current having a switching cycle. Thus, the high-frequency noise current flowing in the series circuit comprising the primary winding and the switching device is bypassed. However, since the bypass capacitor functions as a sufficiently high impedance for the current having the switching cycle, it does not bypass the current having the switching frequency. Accordingly, sufficient power is transmitted to the secondary winding, similarly to a conventional case, while high-frequency electromagnetic radiant noise radiated to ambient space is reduced.

According to a fourth aspect of the invention, there is provided a switching power-supply unit including a transformer having a primary winding and a secondary winding, an input circuit including the primary winding of the transformer, and an output circuit including the secondary winding of the transformer, the input circuit comprising a current-loop circuit including the primary winding, an input power supply for supplying a current to the primary winding, and a switching device for periodically interrupting the current flowing in the primary winding, in which the input circuit has a high-frequency current-loop circuit comprising the primary winding of the transformer, the switching device, and a capacitive device for supplying a current having a frequency higher than the switching frequency of the switching device so that the high-frequency current-loop circuit corresponds to part of the current-loop circuit.

According to this arrangement, in the switching-frequency current-loop circuit of the input circuit, a switching current having a switching cycle flows in accordance with the switching of the switching device. In addition, leakage inductance, the parasitic capacitance of the switching device, etc. mainly cause a high-frequency noise current having a frequency higher than the switching frequency to flow in the current-loop circuit.

However, the high-frequency current-loop circuit allows the passage of a current having a frequency higher than the switching frequency of the switching device. Accordingly, in the current-loop circuit, a high-frequency noise current mainly flows in a part corresponding to the high-frequency current-loop circuit, which reduces high-frequency electromagnetic waves radiated from the input circuit to ambient space, namely, radiant noise. In addition, by forming the high-frequency current-loop circuit of small size, the effects of high-frequency radiant-noise reduction can be enhanced.

The capacitive device functions as a sufficiently low impedance for a noise current having a frequency higher than the frequency of the switching cycle as switched by the switching device, but functions as a sufficiently high impedance for the switching current having the switching cycle. In other words, the capacitive device is a path for the high-frequency noise current, and may comprise, for example, a single function capacitor, a capacitive circuit containing a capacitor, or a capacitor circuit whose capacitance can be changed by switching.

In addition, a variable capacitance device may be used to form the capacitive means. In this case, similarly to the capacitor circuit whose capacitance can be changed, after the switching power-supply unit is assembled, it is possible to perform adjustment to an impedance adapted for a high-frequency noise current having frequency at which high-frequency radiant noise is largest.

According to a fifth aspect of the invention, there is provided a switching power-supply unit, having a circuit base provided with a plurality of interconnection patterns, formed by performing the steps of providing an input-circuit formation region, an output-circuit formation region and a control-circuit formation region on the circuit base, using the interconnection patterns to form a series circuit comprising an input-power supply circuit, a primary winding for a transformer and a switching device in the input-circuit formation region, forming in the output-circuit formation region a rectifying and smoothing circuit including a secondary winding for the transformer, and forming in the control-circuit formation region a control circuit for periodically switching the switching device, the switching device switched to supply a current having a switching frequency from the input-power supply circuit to the primary winding, in which a capacitor for supplying a current having a frequency higher than the switching frequency is connected in the interconnection patterns connected to the series circuit, and is disposed close to the location where the series circuit is formed.

According to this arrangement, the input circuit, the output circuit and the control circuit are formed on the circuit base so that the areas of their regions are defined. In the input-circuit formation region on the circuit base, the interconnection patterns formed on the circuit base are used to closely mount a transformer, a switching device and a capacitor. Therefore, the current-loop circuit in which the high-frequency noise current flows is compressed to reduce high-frequency radiant noise radiated from the circuit base to ambient space.

Moreover, by shortening the interconnection patterns and using chip-type small circuit components, the area on which the high-frequency current-loop circuit is formed can be reduced and the source of generating the high-frequency radiant noise can be reduced.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF THE INVENTION

Hereinafter, the preferred embodiments of the present invention are explained in detail with reference to the drawings.

Figure 1:
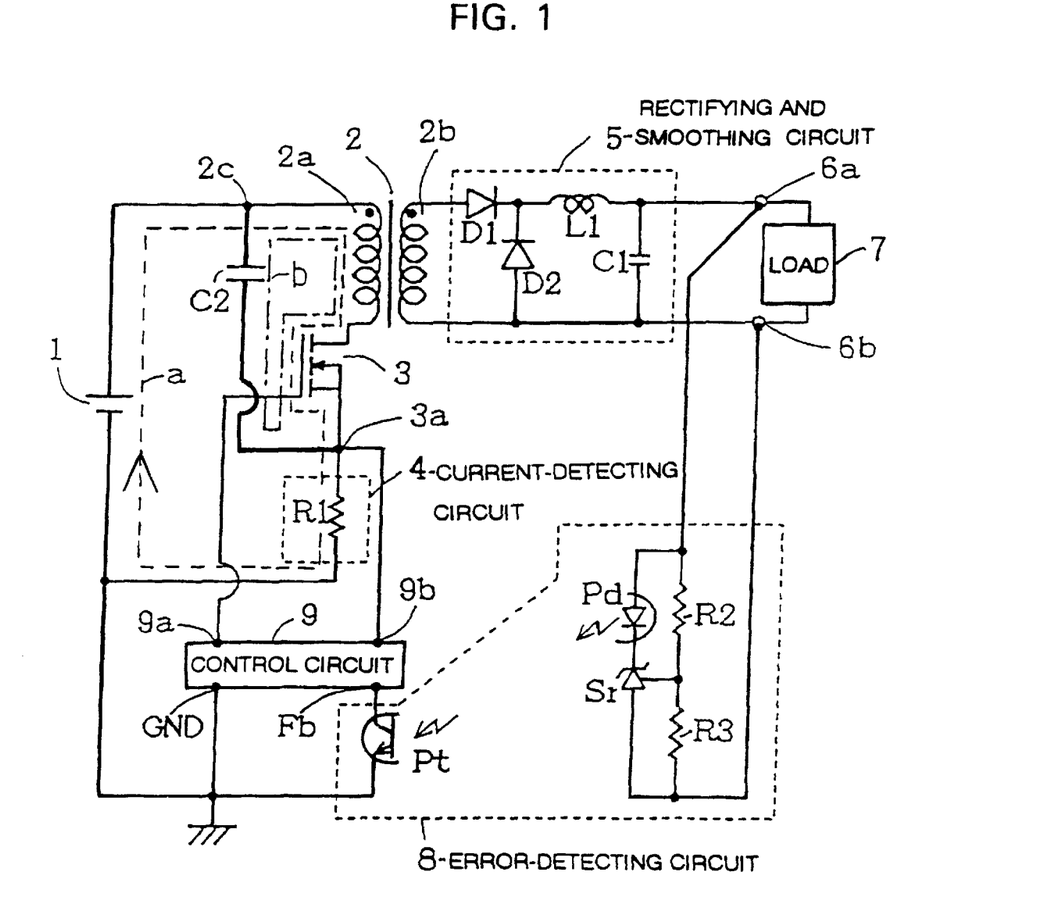
FIG. 1 is a circuit diagram showing one embodiment of a switching power-supply unit according to the present invention.
Figure 5:
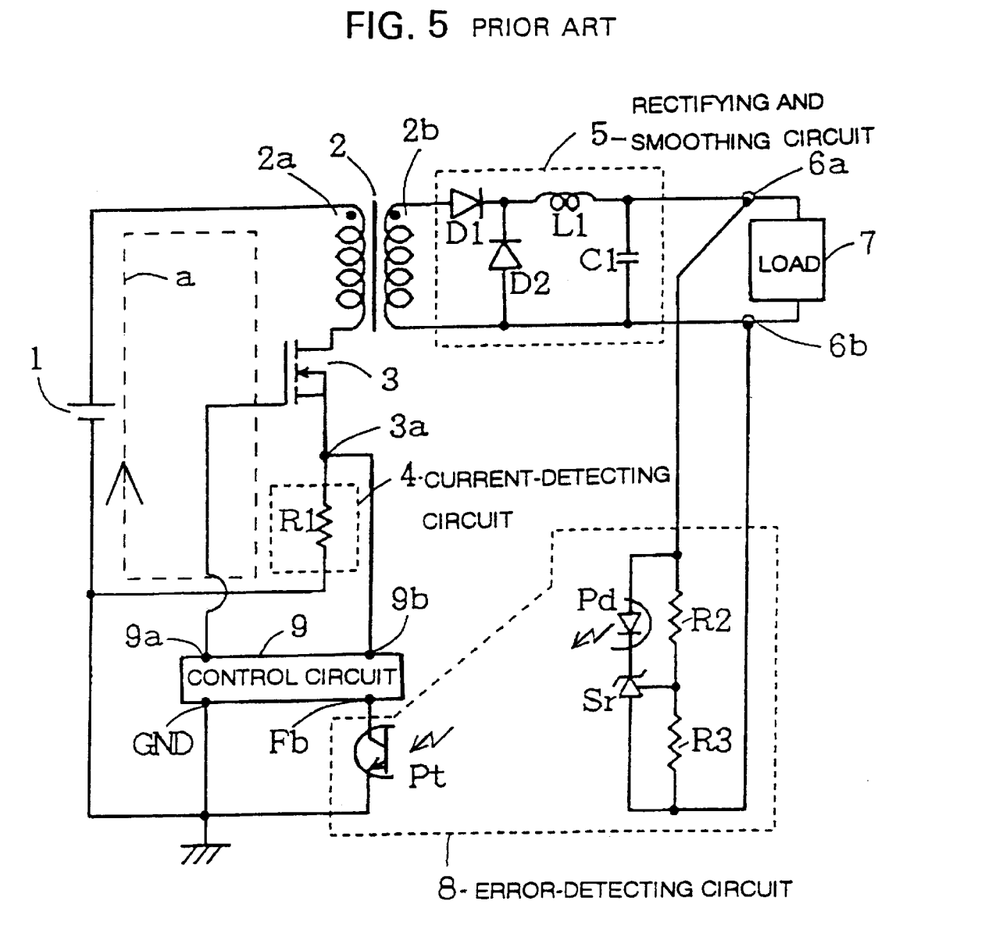
FIG. 5 is a circuit diagram showing a conventional switching power-supply unit.

The switching power-supply unit of the present invention in FIG. 1 relates to an improvement of the conventional switching power-supply unit shown in FIG. 5. Accordingly, concerning components identical to those of the conventional switching power-supply unit, their descriptions will be cited by using identical reference numerals.

In FIG. 1, as indicated by a bold line, noise-eliminating bypass capacitor C2 is connected across the ends of a series circuit comprising the primary winding 2a of a switching transformer 2 and FET 3, in other words, between the input terminal 2c of the primary winding 2a and the source 3a of the FET 3.

The bypass capacitor C2 provides a short circuit path for allowing the passage of a high-frequency noise current in the input circuit of the switching power-supply unit on the side of the primary winding 2a. In other words, the bypass capacitor C2 combines with the primary winding 2a and the FET 3 to form a high-frequency current-loop circuit b, which is a path for allowing the passage of a high-frequency noise current generated by the resonance of a leakage inductance from the switching transformer 2 and the parasitic capacitance of the FET 3. Accordingly, the high-frequency noise current does not flow in the current-loop circuit a including the current-detecting circuit 4 and the input power supply 1, but is bypassed by the bypass capacitor C2. A capacitance for the bypass capacitor C2 is several pF to several thousand pF. The input power supply 1 is a dc power supply, similar to the conventional switching power-supply unit, and is, for example, one in which a rectifying circuit for rectifying a commercial power-supply voltage includes (in parallel) a smoothing capacitor having a capacitance of several dozen pF.

In this circuit, switching the FET 3 allows a switching current having, for example, a frequency of 100 kHz to 2 MHz to pass in the current-loop circuit a including the primary winding 2a of the switching transformer 2 and the FET 3, but this circuit is not short-circuited. In addition, the high-frequency current-loop circuit b including the bypass capacitor C2 allows the passage of a high-frequency noise current having, for example, a frequency of 10 MHz to 500 MHz, but the current-detecting circuit 4 and the input power supply 1 do not substantially pass these noise signals.

Next, FIG. 2 shows a line spectrum envelope Sb as one example of the relationship between a radiant noise level radiated from the switching power-supply unit when it is provided with the bypass capacitor C2, and the frequency. For the experiment, a bypass capacitor C2 which has a capacitance of 1000 pF is selected, and a switching frequency of 1 MHz is used to switch the FET 3. For measurement, a near magnetic field probe comprising a hand-held magnetic sensor was used to measure the level of the radiant noise in the range from 30 MHz to 300 MHz.

Specifically, with the near magnetic field probe fixed near the switching power-supply unit, power proportional to the intensity of the magnetic field radiated from the switching power-supply unit was measured. By inputting the power proportional to the magnetic field intensity to a spectrum analyzer, the radiant noise level was measured. A line spectrum envelope Sa of the conventional switching power-supply unit, shown as comparative data in FIG. 2, was similarly measured.

According to the envelope Sb in the present invention, compared with the conventional envelope Sa, it is clear that the radiant noise level decreases in the whole of the frequency range of 30 MHz to 300 MHz. In particular, the radiant noise level significantly decreases in the frequency range of 50 MHz to 200 MHz.

Figure 3:
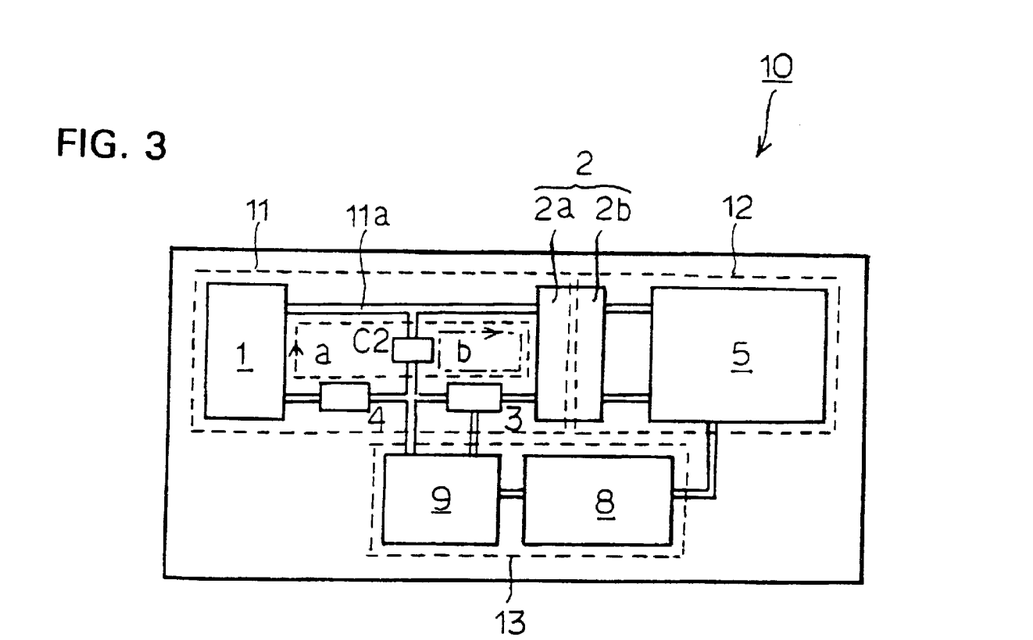
FIG. 3 is a schematic diagram showing the condition where components of the switching power-supply unit according to the present invention are mounted on a circuit base.

Next, in FIG. 3, a circuit base 10 on which circuit components are mounted is schematically shown. The circuit base 10 may be any one of a single-sided circuit base, a double-sided circuit base, and a multilayered circuit base. The circuit base 10 is provided with an input-circuit formation region 11, an output-circuit formation region 12, and a control-circuit formation region 13. In the input-circuit formation region 11, the primary winding 2a of the switching transformer, the FET 3, the bypass capacitor C2, the current-detecting circuit 4, and the input power supply 1 are disposed using a circuit interconnection pattern 11a. In the output-circuit formation region 12, the secondary winding 2b of the switching transformer and the rectifying and smoothing circuit 5 are disposed. In the control-circuit formation region 13, the error-detecting circuit 8 and the control circuit 9 are disposed.

The switching transformer 2, the FET 3 and the bypass capacitor C2 are disposed so as to be close to one another, and the circuit interconnection pattern 11a for connecting these circuit components are also formed to be short. This reduces the size of the high-frequency current-loop circuit b, whose area occupying the circuit base 10 also decreases.

Accordingly, the area of the interconnection pattern on the circuit base 10 in which the high-frequency noise current flows, namely, the size of the high-frequency current-loop circuit b, decreases to reduce radiant noises having a high frequency.

When the rise of a pulse for driving the FET 3 is shaped to be steep in order to enhance the transmission efficiency of power from the input circuit to the output circuit, the frequency of the high-frequency noise current increases. Also, in this case, by selectively using an electrostatic capacitance for the bypass capacitor C2, the high-frequency noise current can efficiently be bypassed.

In the embodiment in FIG. 1, only the bypass capacitor C2 is shown. However, another capacitive impedance circuit as a short circuit path for the high-frequency noise current may be connected across the input terminal 2c and the source 3a of the FET 3. A specific description will be given using FIG. 4.

Figure 4A:
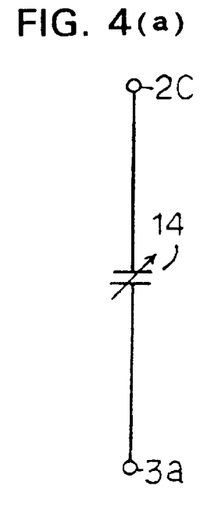
FIGS. 4(a) to 4(g) are diagrams respectively showing capacitive impedance devices used as short circuit paths for a high-frequency noise current in the switching power-supply unit according to the present invention.

First, as shown in FIG. 4(a), a variable capacitor 14 may be connected across the terminal 2c and the source 3a. By changing the electrostatic capacitance of the variable capacitor 14, the frequency of the high-frequency noise current can be changed. As a result, the shape of the line spectrum envelope Sb can be changed.

Figure 4B:
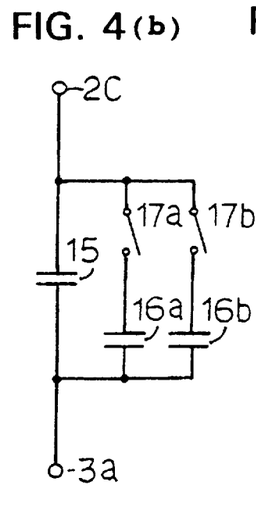

Second, as shown in FIG. 4(b), a series circuit comprising an adjusting capacitor 16a and a switch 17a, and a series circuit comprising an adjusting capacitor 16b and a switch 17b are connected in parallel to a capacitor 15 as a short circuit path for the high-frequency noise current. By selectively switching the switches 17a and 17b so that the capacitive impedance is adjusted to be large, the current having a frequency at which the radiant noise is largest can be bypassed.

Figure 4C:
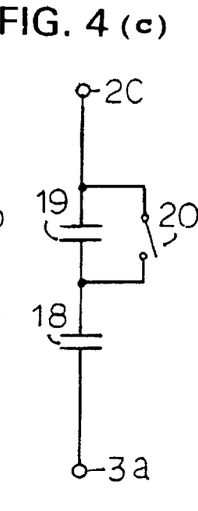

Third, as shown in FIG. 4(c), an adjusting capacitor 19 is connected in series with a capacitor 18 as a short circuit path for the high-frequency noise current, and a switch 20 is connected in parallel across the ends of the capacitor 19. In this case, by opening the switch 20, the capacitive impedance can be decreased.

Figure 4D:
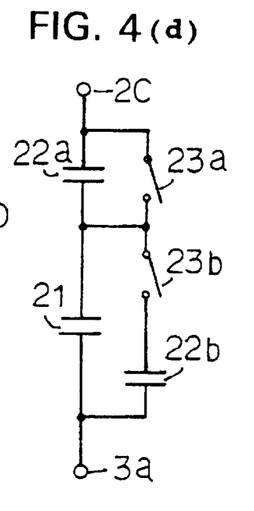

Fourth, as shown in FIG. 4(d), an adjusting capacitor 22a is connected in series to a capacitor 21 as a short circuit path for the high-frequency noise current, and a switch 23a is connected in parallel to the ends of the capacitor 22a. A series circuit comprising the adjusting capacitor 22b and the switch 23b is connected in parallel to the capacitor 21. In this circuit, closing the switch 23a reduces the capacitive impedance, and closing the switch 23b increases the capacitive impedance. By combining the opening and closing of the switches, many variations of the capacitive impedance can be achieved.

Figure 4E:
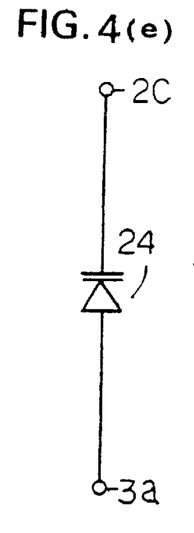

Fifth, as shown in FIG. 4(e), a capacitive diode 24, for example, a variable capacitance diode in which the capacitance changes in accordance with a reverse current, or varactor diode may be used. In this case, the cathode of the capacitive diode 24 is connected to the terminal 2c.

Figure 4F:
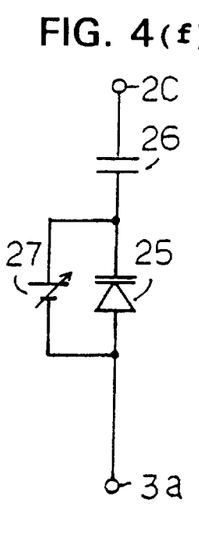

Sixth, as shown in FIG. 4(f), a dc cut capacitor 26 is connected in series with a variable capacitance diode 25, with the cathode of the diode 25 directed toward the terminal 2c. In addition, a dc variable power supply 27 is provided for supplying a reverse bias voltage across the ends of the capacitive diode 25. By changing the dc voltage supplied by the variable power supply 27, the capacitive impedance can be adjusted to be large or small, and a current having a frequency at which radiant noise is largest can be bypassed.

Figure 4G:
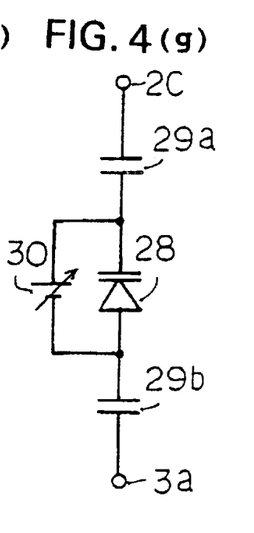

Seventh, as shown in FIG. 4(g), dc cut capacitors 29a and 29b are connected in series to the ends of a variable capacitance diode 28.

In addition, in the embodiment in FIG. 1, FET 3 is shown as a switching device. However, it may be a MOSFET or a bipolar transistor. The input power supply 1 is preferably a power supply capable of supplying a dc current, such as an electric-apparatus dc power supply having a built-in switching power-supply unit or a battery.

In FIG. 1, the switching power-supply unit, which is a forward converter type, is shown as one example. However, the present invention may be applied to a flyback converter type, a bridging choke converter type, etc., namely, switching power-supply units having a switching-frequency current-loop circuit which includes switching devices such as an FET or a transistor.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power-supply comprising a circuit base provided with a plurality of interconnection patterns, formed by performing the steps of providing an input-circuit formation region, an output-circuit formation region and a control-circuit formation region on said circuit base, using said interconnection patterns to form a series circuit comprising an input-power supply circuit, a primary winding for a transformer and a switching device in said input-circuit formation region, forming in said output-circuit formation region a rectifying and smoothing circuit including a secondary winding for said transformer, and forming in said control-circuit formation region a control circuit for periodically switching said switching device, said switching device being switched to supply a current having a switching frequency from said input-power supply circuit to the primary winding, wherein a capacitor for supplying a current having a frequency higher than said switching frequency is connected in said interconnection patterns connected to said series circuit, and is disposed close to a location where said series circuit is formed.

2. A switching power-supply comprising a circuit base provided with a plurality of interconnection patterns, the circuit base including an input-circuit formation region, an output-circuit formation region and a control-circuit formation region, said interconnection patterns comprising a series circuit comprising an input-power supply circuit, a primary winding for a transformer and a switching device in said input-circuit formation region, said output-circuit formation region comprising a rectifying and smoothing circuit including a secondary winding for said transformer, and said control-circuit formation region comprising a control circuit for periodically switching said switching device, said control circuit switching said switching device to supply a current having a switching frequency from said input-power supply circuit to the primary winding, wherein a capacitor for supplying a current having a frequency higher than said switching frequency is connected in said interconnection patterns connected to said series circuit, and is disposed close to a location where said series circuit is formed.

3. The switching power supply of claim 1, wherein the capacitor comprises one of a fixed value capacitor, a variable capacitor, a capacitive diode and a series and/or parallel combination, switched or unswitched, of the foregoing.

4. The switching power supply of claim 2, wherein the capacitor comprises one of a fixed value capacitor, a variable capacitor, a capacitive diode and a series and/or parallel combination, switched or unswitched, of the foregoing.

5. A switching power-supply, comprising:

a transformer having a primary winding and a secondary winding;

an output circuit coupled to the secondary winding and receiving an induced voltage therefrom;

a switching transistor coupled in series with the primary winding of the transformer for periodically interrupting current flow in the primary winding at a switching frequency; and a variable capacitor circuit coupled in shunt across the series coupled primary winding and switching transistor, the variable capacitor circuit providing a low impedance path for current having a frequency higher than the switching frequency of the switching transistor.

6. The switching power-supply of claim 5, wherein the variable capacitor circuit includes a variable capacitor coupled in shunt across the series coupled primary winding and switching transistor.

7. The switching power-supply of claim 5, wherein the variable capacitor circuit includes a first capacitor coupled in shunt across the series coupled primary winding and switching transistor and a second capacitor variably connectable across the first capacitor.

8. The switching power-supply of claim 7, wherein the variable capacitor circuit further includes a first switching element coupled in series with the second capacitor such that the first and second capacitors are connected in parallel when the first switching element is closed.

9. The switching power-supply of claim 7, wherein the variable capacitor circuit further includes a third capacitor variably connectable across at least one of the first and second capacitors.

10. The switching power-supply of claim 9, wherein the variable capacitor circuit further includes a second switching element coupled in series with the third capacitor such that the first and third capacitors are connected in parallel when the second switching element is closed.

11. The switching power-supply of claim 5, wherein the variable capacitor circuit includes:

first and second series coupled capacitors, the series coupled capacitors being coupled in shunt across the series coupled primary winding and switching transistor; and a first switching element coupled in shunt across the first capacitor such that a short circuit across the first capacitor is obtained when the first switching element is closed.

12. The switching power-supply of claim 11, wherein the variable capacitor circuit further includes a third capacitor variably connectable across the second capacitor.

13. The switching power-supply of claim 12, wherein the variable capacitor circuit further includes a second switching element coupled in series with the third capacitor such that the second and third capacitors are connected in parallel when the second switching element is closed.

14. A switching power-supply, comprising:

a transformer having a primary winding and a secondary winding;

an output circuit coupled to the secondary winding and receiving an induced voltage therefrom;

a switching transistor coupled in series with the primary winding of the transformer for periodically interrupting current flow in the primary winding at a switching frequency; and a capacitive diode coupled in shunt across the series coupled primary winding and switching transistor, the capacitive diode providing a low impedance path for current having a frequency higher than the switching frequency of the switching transistor.

15. The switching power-supply of claim 14, further comprising a variable DC source coupled in parallel with the capacitive diode.

16. The switching power-supply of claim 15, further comprising a first capacitor coupled in series with the variable DC source and capacitive diode.

17. The switching power-supply of claim 16, further comprising a second capacitor coupled in series with the variable DC source and capacitive diode.

* * * * *